Patented June 18, 1946

2,402,316

UNITED STATES PATENT OFFICE 2,402,316

PROCESS FOR REFINING LEAD AND LEAD ALLOYS

Joseph C. Dittmer, St. Albans, N. Y., assignor to National Lead Company, New York, N. Y., a corporation of New Jersey No Drawing. Application October 18, 1944, Serial No. 559,251

7 Claims. (Cl. 75—78)

The present invention relates to the refining of lead and lead alloys and more particularly to the removal of bismuth therefrom.

It is known that bismuth may be removed from lead and lead alloys by means of alkali and alkaline earth metals, which react with the bismuth to form intermetallic compounds, called bismuthides, having higher melting points than the base metal (lead or lead alloy) treated. However, prior to the present invention and that described in my co-pending application, Serial No. 435,294, filed March 19, 1942, such prior art methods of bismuth removal have not been wholly satisfactory since, because of the solubility of the bismuthide in the base metal, it has not been possible to obtain a substantially complete removal of the bismuth from the lead or lead alloy.

It is an object of the present invention to provide a simple and economical method for the removal of bismuth from lead and lead alloys. It is another object of the present invention to remove bismuth from lead and lead alloys by means of an agent (hereinafter sometimes generically referred to as "debismuthizing agent") formed, in situ, in the molten bath of lead or lead alloy to be refined. These and other objects will be apparent from the following description of the invention.

The present application is a continuation-in-part of my aforementioned application, Serial No. 435,294. In that application there is described a method for the debismuthizing of lead and lead alloys by means of alkali metal and alkaline earth metal debismuthizing agents in conjunction with the use of a flux of caustic alkali metal hydroxide. According to one preferred embodiment of that method the debismuthizing agent, preferably metallic sodium, is admixed with the bismuth-containing lead or lead alloy. According to the present invention the debismuthizing agent is formed, in situ, within the bath of lead or lead alloy.

In its broadest aspect, the present invention contemplates the removal of bismuth from lead and lead alloys by means of a process which includes melting the metal to be purified, admixing therewith a flux of alkali metal hydroxide, preferably sodium hydroxide (caustic soda) and a reducing agent, which, by reaction with said flux forms, in situ, an alkali metal debismuthizing agent.

In practicing the present invention, the impure lead or lead alloy containing bismuth may be melted in an ordinary iron pot. It is then covered with the alkali metal hydroxide flux in an amount sufficient to yield, upon reaction with the reducing agent, alkali metal for the debismuthizing of the base metal and to hold in suspension the by-products of the reduction and in solution the bismuthides. Although the process of the present invention is operable using any alkali metal hydroxide flux, for instance, potassium or sodium hydroxide and any reducing agent therefor, such as calcium carbide, ferrosilicon, or carbon, which at temperatures of the molten bath will reduce the alkali metal hydroxide to alkali metal, the preferred embodiment includes the use of a caustic soda flux and calcium carbide reducing agent. The invention will, therefore, be further described with reference to the use of these preferred reagents, it being understood that the invention is not to be limited thereto.

When employing caustic soda and calcium carbide there occurs at temperatures above 550° C. a reaction which may be equated as follows:

$$2CaC_2 + 2NaOH \rightarrow 2Na + 2CaO + C_2H_2$$

It is, accordingly, desirable during the treatment to hold the temperature as close as possible to 550° C., meanwhile continuously stirring the reaction mixture. It will be understood that where other reducing agents are employed it may be necessary to operate at somewhat higher temperatures. However, since so to do is more costly, this constitutes one of the reasons favoring the use of calcium carbide as the reducing agent and caustic soda as the flux. Since in the foregoing reaction frothing occurs it is desirable to add the calcium carbide gradually over a period of time in order to avoid excess frothing and in an amount sufficient to yield enough metallic sodium to produce a 4 to 5% sodium-lead alloy. The treatment is complete in a relatively short time, usually from about one hour to about five hours and generally in about three and one-half hours at 550° C., depending upon the period of time taken for addition of the calcium carbide. After completion of the reaction the flux will be found to contain the bismuth in the form of bismuthide as well as the calcium oxide formed in the reaction and may be skimmed off the molten purified lead or lead alloy. However, before skimming it is desirable to drop the temperature of the bath to about 340° C. for a short time, say between one-half and one hour, because at this temperature the bismuthide is less soluble in the molten metal and at the same time more soluble in the caustic soda flux.

The skimmed flux can now be treated by any of the bismuth recovery methods outlined in my pending patent application, Serial No. 435,294, but I prefer to use the method of reclaiming the bismuth by concentrating it in another metal. The molten caustic soda flux or slag from the "bismuth removal" pot can be transferred to the "bismuth collecting" pot containing a relatively small amount of a Bi-Pb alloy from other treatments, the sodium content of this alloy being kept low by treatment with air or steam. The molten caustic soda slag containing the dissolved bismuthide is stirred in contact with the "bismuth collecting" alloy for about an hour at temperatures ranging from 340° to 750° C. and preferably at the higher temperature. The higher the temperature used, the faster the transfer of the bismuth by solution in the alloy, the greater the elimination of sodium by oxidation and the faster and more completely the free carbon left by the carbide reaction in the slag, is burnt out.

After the bismuth has been dissolved out of the slag, the slag is leached with the minimum amount of water required to dissolve the caustic soda, the lime (CaO) which is insoluble, being separated by settling, filtration, and washing. The resulting solution of caustic soda is used to remove the excess sodium in the de-bismuthized molten lead by projecting a stream of it into the vortex of the vigorously stirred metal at a temperature of about 350° C. according to the process of my U. S. Patent No. 1,976,333. The caustic soda is thereby simultaneously concentrated to a fused condition for re-use in other de-bismuthizing operations.

The following is an illustrative example of the practice of the present invention.

| | |
|---|---|
| Original metal | 5500 g. |
| Bismuth content before treatment | 0.10%. |
| Flux used | 4000 g. of sodium hydroxide, technical grade. |
| Reagent used | 800 g. of calcium carbide, technical grade. |
| Vortical stirrer speed | 1230 R. P. M. |
| Temperature of reaction | Approximately 550° C. |
| Time required | About 3½ hours. |
| Resulting treated metal | 5623 g. |
| Bismuth after treatment at 550° C | 0.013%. |
| Bismuth after treatment at 550° C. and cooled to 342° C | 0.008%. |

The impure lead alloy containing bismuth was melted in an ordinary iron pot covered with the flux of molten caustic soda. The amount employed (4000 g.) was sufficient both for producing the desired amount of sodium metal by subsequent reaction with the calcium carbide and for holding in suspension the calcium oxide resulting from this reaction. The flux covering also acted to prevent the oxidation of the underlying Na-Pb alloy. The molten metal and caustic soda flux were heated to about 550° C., the addition of calcium carbide was begun and during the ensuing reaction the temperature was held as close as possible to 550° C. The contents of the pot were stirred during the addition of the calcium carbide to bring the fresh surfaces of lumps of calcium carbide into more intimate and quicker contact with the caustic soda and the resulting sodium into contact with the metal. The amount of calcium carbide added (800 g.) was sufficient to produce a 4 to 5% sodium lead alloy. The calcium carbide was gradually added over a period of 2 hours in order to control the foaming which accompanies the reaction. The reaction appeared to be completed ½ hour later. The temperature was dropped from about 550° C. to about 340° C. and held there for about 30 minutes because at this temperature the bismuthide is less soluble in the molten lead and at the same time more soluble in the caustic soda flux. While this drop in temperature is not always necessary and, in fact, in most cases substantially all bismuth can be removed, according to the present invention, by allowing the metal to cool without holding it at the lower temperature, it is desirable to check the cooling to insure substantially complete removal of the bismuth.

A sample of the purified metal obtained by practice of the foregoing example showed that practically all the bismuth had been removed.

From the foregoing description of the present invention certain advantages will be appreciated: First, calcium carbide is more easily handled and with less danger than is metallic sodium. Second, the higher specific gravity of calcium carbide as compared to metallic sodium (2.2 as against 0.97) permits the calcium carbide to sink in the molten caustic soda flux to the surface of the molten lead and thus simplify the problem of adequate agitation. Third, the caustic soda used by the reaction is recoverable by the process of my Patent No. 1,976,333 and the process is, hence, an economical one.

Not only is the present invention useful in the removal of bismuth from lead and lead alloys but it has been found, that it is efficacious in removing arsenic and antimony from such metals.

The foregoing description of the present invention has been given for illustrative purposes only and it will be understood that the appended claims embrace such changes and modifications thereof which may be accomplished by exercise of the skill of the art.

I claim:

1. Process for the removal of bismuth, arsenic and antimony from lead and lead alloys which comprises melting the alloy to be purified, covering the same with a flux of alkali metal hydroxide, adding thereto a reducing agent capable of forming alkali metal by reaction with said alkali metal hydroxide, stirring the mixture and maintaining it at a temperature sufficient to promote reaction between said reducing agent and the alkali metal hydroxide, and upon completion of the reaction skimming off the flux from the purified metal.

2. In a method for debismuthizing lead and lead alloys which includes the use of an alkali metal debismuthizing agent and an alkali metal hydroxide flux, the step which consists in forming the alkali metal, in situ, by means of a reaction between said alkali metal hydroxide and a reducing agent therefor.

3. In a method for debismuthizing lead and lead alloys which includes the use of metallic sodium as a debismuthizing agent and a flux of sodium hydroxide, the step which consists in forming the sodium metal, in situ, by means of a reaction between the sodium hydroxide and calcium carbide.

4. Process for removal of bismuth from lead and lead alloys which comprises melting the metal to be purified, covering said molten metal with a flux of sodium hydroxide, gradually adding thereto calcium carbide in an amount sufficient to yield by reaction with said sodium hydroxide metallic sodium in an amount equal to between 4% and about 5% based on the weight of metal to be purified, maintaining the temperature of the metal during the addition of the calcium carbide at about 550° C., and upon completion of the reaction skimming off the flux from the purified metal.

5. Process according to claim 4 wherein after the reaction is completed at about 550° C. the temperature is dropped to about 340° C. and held there prior to skimming off the flux for from about one-half hour to one hour.

6. In a method for debismuthizing lead and lead alloys which includes the use of metallic sodium as a debismuthizing agent and a flux of sodium hydroxide, the step which consists in forming the sodium metal in situ, by means of a reaction between sodium hydroxide and ferro-silicon.

7. In a method for debismuthizing lead and lead alloys which includes the use of metallic sodium as a debismuthizing agent and a flux of sodium hydroxide, the step which consists in forming the sodium metal in situ, by means of a reaction between sodium hydroxide and carbon.

JOSEPH C. DITTMER.